(12) United States Patent
Dusanapudi et al.

(10) Patent No.: US 10,007,568 B2
(45) Date of Patent: *Jun. 26, 2018

(54) TESTING A NON-CORE MMU

(71) Applicant: International Business Machines Corporation, Armonk, NY (US)

(72) Inventors: Manoj Dusanapudi, Bangalore (IN); Shakti Kapoor, Austin, TX (US); Paul F. Lecocq, Round Rock, TX (US); John A. Schumann, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 76 days.

This patent is subject to a terminal disclaimer.

(21) Appl. No.: 15/096,989

(22) Filed: Apr. 12, 2016

(65) Prior Publication Data

US 2017/0192829 A1 Jul. 6, 2017

Related U.S. Application Data

(63) Continuation of application No. 14/989,187, filed on Jan. 6, 2016.

(51) Int. Cl.
| | |
|---|---|
| G06F 11/00 | (2006.01) |
| G06F 11/07 | (2006.01) |
| G06F 13/24 | (2006.01) |
| G06F 13/42 | (2006.01) |
| G06F 11/22 | (2006.01) |

(Continued)

(52) U.S. Cl.
CPC ........ G06F 11/073 (2013.01); G06F 11/0727 (2013.01); G06F 11/2231 (2013.01); G06F 11/2236 (2013.01); G06F 11/261 (2013.01); G06F 11/2736 (2013.01); G06F 13/24 (2013.01); G06F 13/4282 (2013.01)

(58) Field of Classification Search
CPC .................................................... G06F 11/073
USPC ..................... 714/33, 10, 32, 30, 733, 734
See application file for complete search history.

(56) References Cited

U.S. PATENT DOCUMENTS

| 6,233,667 B1 | 5/2001 | Shaylor et al. |
| 6,532,553 B1 | 3/2003 | Gwilt et al. |

(Continued)

OTHER PUBLICATIONS

List of IBM Patents or Patent Applications Treated As Related.

*Primary Examiner* — Dieu-Minh Le
(74) *Attorney, Agent, or Firm* — Patterson + Sheridan, LLP

(57) ABSTRACT

Embodiments herein provide a testing apparatus (whether physical or simulated) for testing a non-core MMU in a processor chip. Unlike core MMUs, non-core MMUs may be located in a part of the processor chip outside of the processing cores in the chip. Instead of being used to perform address translation requests sent by the processing core, the non-core MMUs may be used by other hardware modules in the processor chip such as compression engines, crypto engines, accelerators, etc. In one embodiment, the testing apparatus includes a MMU testor that transmits the translation requests to the non-core MMU which tests its functionality. Using the data provided in the translation requests, the non-core MMU performs virtual to physical address translations. The non-core MMU transmits the results of these translations to the MMU testor which compares these results to expected results to identify any design flaws in the non-core MMU.

5 Claims, 4 Drawing Sheets

(51) Int. Cl.
G06F 11/26 (2006.01)
G06F 11/273 (2006.01)

(56) References Cited

U.S. PATENT DOCUMENTS

| | | |
|---|---|---|
| 8,464,251 B2 | 6/2013 | Sahita et al. |
| 8,938,602 B2 | 1/2015 | Sharp et al. |
| 8,966,320 B2 * | 2/2015 | Nakaide ................ G06F 11/273 |
| | | 714/42 |
| 2008/0209160 A1 | 8/2008 | Katz et al. |
| 2010/0223505 A1 | 9/2010 | Andreev et al. |
| 2013/0155074 A1 | 6/2013 | Rubin et al. |
| 2016/0210069 A1 * | 7/2016 | Lutas .................... G06F 3/0622 |
| 2016/0378674 A1 | 12/2016 | Cheng et al. |
| 2017/0192869 A1 | 7/2017 | Dusanapudi et al. |

* cited by examiner

TESTING A NON-CORE MMU

CROSS-REFERENCE TO RELATED APPLICATIONS

This application is a continuation of co-pending U.S. patent application Ser. No. 14/989,187, filed Jan. 6, 2016. The aforementioned related patent application is herein incorporated by reference in its entirety.

BACKGROUND

The present invention relates to testing non-core memory management units (MMUs).

Typically, processing cores include at least one MMU (referred to herein as core MMUs) for performing virtual to physical address translations. For example, the processing core may assign blocks of virtual memory to different processes executing on the processor (e.g., operating systems or user applications). Each of the virtual addresses corresponds to a physical memory address in memory. The mappings between the virtual and physical addresses are stored in a page table as page table entries. The page table is typically stored in main memory.

When a process sends a request to a processing core to read data from, or write data to, a particular virtual address, the MMU queries the page table (or a translation lookaside buffer) to identify the corresponding physical address. The processing core then uses the physical address to perform the read or write requested by the process.

SUMMARY

Another embodiment of the present invention is a method that includes transmitting translation requests from a MMU testor to a non-core MMU disposed on a processor chip, where the non-core MMU is external to a processing core of the processor chip, and where the MMU testor is disposed on a computing component external to the processor chip. The method also includes receiving memory translation results from the non-core MMU at the MMU testor.

BRIEF DESCRIPTION OF THE SEVERAL VIEWS OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments herein provide a testing hardware module (whether physical or simulated) for testing a non-core MMU in a processor chip. Unlike core MMUs, non-core MMUs are located in a part of the processor chip (e.g., a semiconductor chip) outside of the processing core (or cores) in the chip. Instead of being used to perform address translation requests sent by the processing core, the non-core MMUs may be used by other hardware modules in the processor chip such as compression engines, crypto engines, accelerators, and the like. As such, the non-core MMUs may be inaccessible to the processing core. While the processing core can test the functionality of the core MMU, because the processing core may not be communicatively coupled to the non-core MMus in the chip, the testing hardware module (referred to as a MMU testor) is used to test the functionality of the non-core MMUs.

In one embodiment, the MMU testor is separate from the processor chip. For example, the MMU testor may be disposed on a field-programmable gate array (FPGA) that is communicatively coupled to the processor chip via a communication link. Using the link, the MMU testor transmits translation requests to the non-core MMU to test its functionality. Using the data provided in the translation requests, the non-core MMU accesses a page table in memory to perform virtual to physical address translations. The non-core MMU transmits the results of these translations to the MMU testor which compares these results to expected results to identify any errors. If an error is found, the MMU testor reports this error to a system designer for further evaluation.

Figure 1:
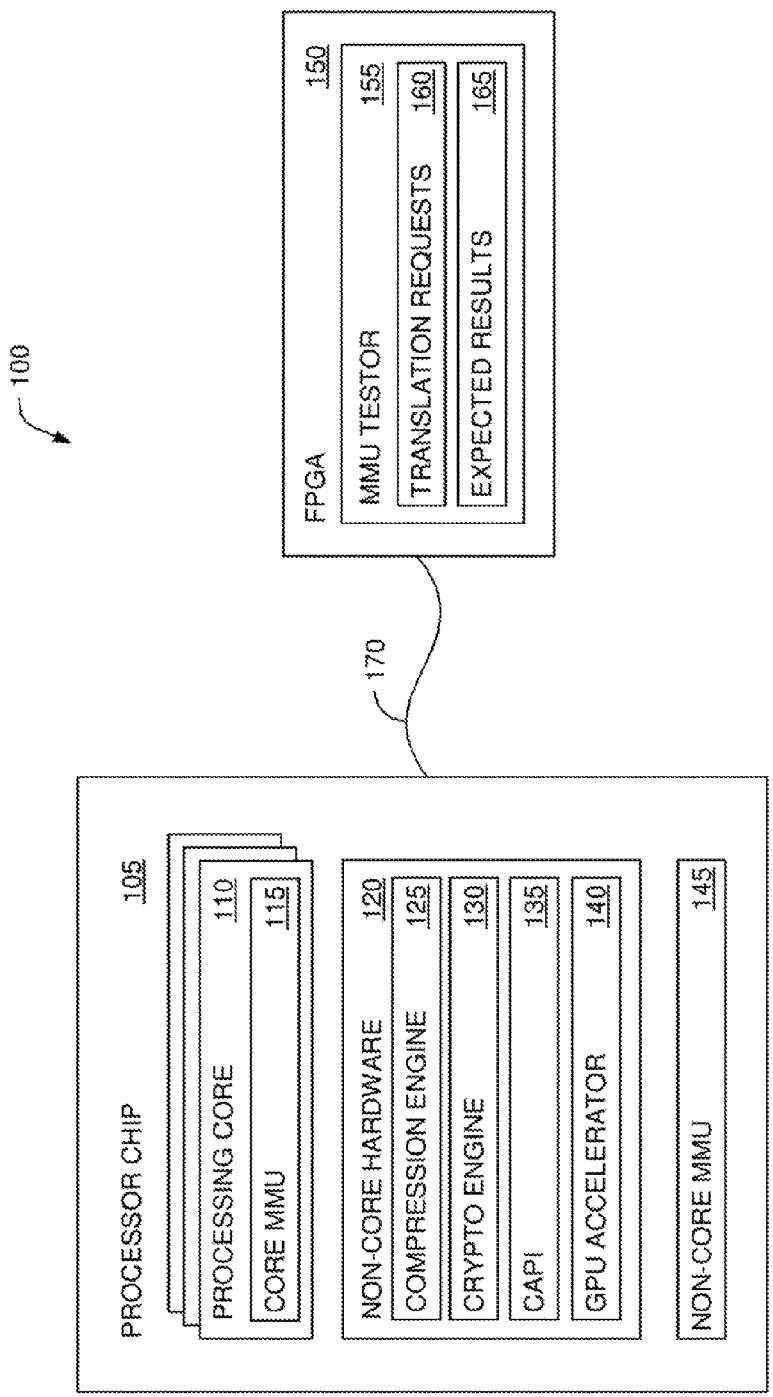
FIG. 1 is a block diagram of a computing system for testing a non-core MMU, according to one embodiment described herein.

FIG. 1 is a block diagram of a computing system 100 for testing a non-core MMU 145, according to one embodiment described herein. The system 100 includes a processor chip 105 and a FPGA 150 for testing the non-core MMU 145 on the chip 105. Specifically, the chip 105 includes one or more processing cores 110, non-core hardware 120, and the non-core MMU 145. The processing cores 110 may each include a dedicated core MMU 115 for performing addresses translations for the processes executing on the respective cores 110. For example, the processing core 110 may execute two different processes which are assigned different blocks of virtual memory. When performing reads or writes to these addresses, the processing core 110 sends a request to the core MMU 115 to translate the virtual memory addresses into physical memory addresses (and vice versa). In one embodiment, the core MMU 115 is located in the portion of the processor chip 105 that includes the processing core 110, but this is not a requirement. For example, the core MMU 115 may still be dedicated for use by the processing core 115 even if the MMU 115 is located elsewhere in the processor chip 105.

The non-core hardware 120 includes a compression engine 125, crypto engine 130, coherent accelerator processor interface (CAPI) 135, and graphics processing unit (GPU) accelerator 140 which are located in the chip 105 external to the processing core 110. Put differently, the non-core hardware 120 are formed on the same semiconductor substrate as the processing core 110 but are outside the boundaries of the hardware elements of the core 110. In one embodiment, one or more of the hardware modules using the non-core MMU 145 may not be located on the processor chip 105. For example, the CAPI 135 permits requesting components external to the processing chip 105 to use the non-core MMU 145 to perform address translations. For example, the requesting components could be integrated circuit (IC) chips or FPGAs that are coupled to the processing chip 105 using a PCIe link or a NVLink™ (NVLink is a trademark of NVIDIA Corporation in the US and other jurisdictions).

Instead of using the core MMU 115 to perform virtual to physical address translations, the non-core hardware 120 uses the non-core MMU 145 to perform address translations. That is, the non-core hardware 120 is communicatively coupled to the non-core MMU 145. In one embodiment, the non-core MMU 145 is used exclusively by the non-core hardware 120, and as such, is not communicatively coupled to the processing cores 110. As a result, the processing core 110 may be unable to use the non-core MMU 145 to perform address translations. Moreover, the list of non-core hardware illustrated in FIG. 1 is a non-limiting example of hardware components that may use a non-core MMU to perform address translations. In other embodiments, the processor chip 105 may have fewer or greater number of hardware modules that use the non-core MMU 145. Furthermore, although only one non-core MMU 145 is shown, the processor chip 105 may include any number of non-core MMUs 145. In one embodiment, the non-core MMU 145 is located outside of the portion of the processor chip 105 containing the processing cores 110. For example, the non-core MMU 145 may be located in communication links or fabrics that couple the processing cores 110 to each other. However, the processing cores 110 may be unable to communicate with the non-core MMU 145.

The FPGA 150 includes a MMU testor 155 for validating and troubleshooting the non-core MMU 145. Because the processor chip 105 may not have any routes or traces communicatively coupling the non-core MMU 145 to any of the processing cores 110, the MMU testor 155 validates the functionality of the non-core MMU 145. However, in other embodiments, the non-core MMU 145 may be communicatively coupled to the processing core 110 but the computing system 100 may nonetheless use an external computing component (e.g., the FPGA 150 or separate IC chip) to test the non-core MMU 145. One reason for doing so may be that the MMU testor 155 may be able to test the limits and design of the non-core MMU 145 better than the processing core 110. Stated differently, using the MMU testor 155, which is specifically designed to test the non-core MMU 145, may enable the computing system 100 to better test the bandwidth of the non-core MMU 145, or perform the test quicker than if the processing core 110 (or any of the non-core hardware 120) was used to test the non-core MMU 145.

The MMU testor 155 includes translation requests 160 and expected results 165. The translation requests 160 represent multiple virtual to physical address translation requests that can be executed by the non-core MMU 145. In one embodiment, the translation requests 160 represent all the different possible types or combinations of translations requests that may be sent to the non-core MMU by the non-core hardware 120 during execution. Thus, if the non-core MMU 145 correctly processes the translation requests 160 when being tested, the MMU testor 155 determines the MMU 145 was designed properly.

The computing system 100 includes a communication link 170 (e.g., PCIe link) that couples the FPGA 150 to the processor chip 105. In one embodiment, the communication link 170 is a PCIe link which uses a special protocol—e.g., CAPI—to communicate with the non-core MMU 145. As described in more detail below, the MMU testor 155 uses the link 170 to transmit the translation requests 160 to the non-core MMU 145 for execution. In response, the non-core MMU 145 performs the corresponding address translations and forwards the resulting addresses to the MMU testor 155 using link 170. The MMU testor 155 also includes expected results 165 that are compared to the translation results received from the non-core MMU 145. If the expected results 165 do not match the results received from the non-core MMU 145, the MMU testor 155 determines there is an error and enters a troubleshooting mode.

Figure 2:
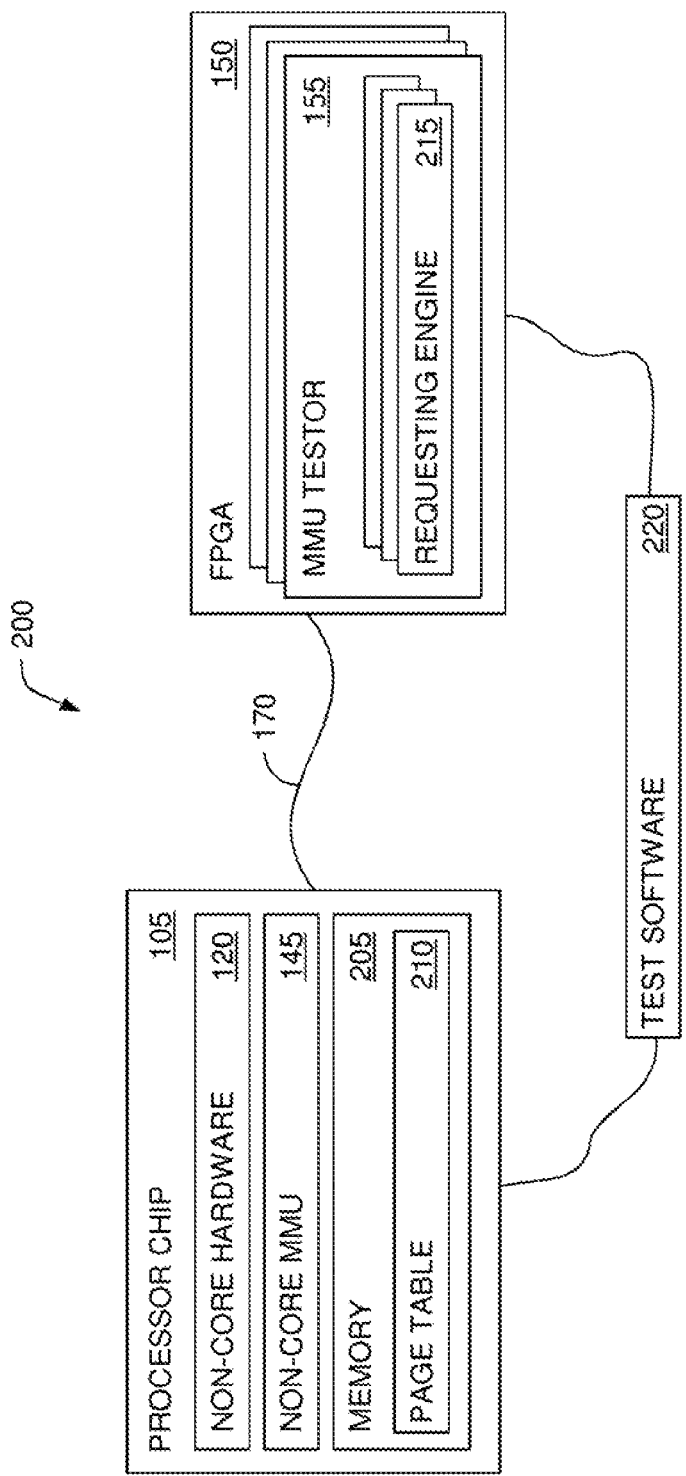
FIG. 2 is a block diagram of a computing system for testing a non-core MMU, according to one embodiment described herein.

FIG. 2 is a block diagram of a computing system 200 for testing the non-core MMU 145, according to one embodiment described herein. The processing core 110 includes the non-core hardware 120, the non-core MMU 145, and a memory 205. For clarity, the processing core 110 has been omitted from the processor chip 105.

The memory 205 includes a page table 210 which stores the mappings of virtual addresses to physical addresses used by the processes executing on the processor chip 105. Although not shown, the processor chip 105 may also include a translation lookaside buffer (TLB) that is used by the MMUs in the chip 105 to perform the address translations. Moreover, the page table 210 may be accessed by both the non-core MMU 145 as well as the core MMUs (not shown). Although FIG. 2 illustrates storing the page table 210 in memory 205 on the processor chip 105, in other embodiments, the page table 210 may be stored on memory external to the processor chip 105 (e.g., main memory).

As shown, the MMU testor 155 includes multiple requesting engines 215 which submit the translation requests to the non-core MMU 145. For example, the engines 215 may submit translation requests in parallel to the non-core MMU 145 which means the MMU 145 may be handling multiple different translation requests concurrently. Although having multiple requesting engines 215 is not necessary, the multiple engines 215 can make it easier to test the bandwidth of the non-core MMU 145 to determine how many requests the non-core MMU 145 can process in a set amount of time.

Computing system 200 includes test software 220 for instructing the MMU testor 155 to test or validate the functionality of the non-core MMU 145. In one embodiment, the test software 220 may generate and store the virtual to physical mappings in the page table 210. Moreover, the test software 220 may provide the translation requests and expected results to the MMU testor 155.

In one embodiment, once the test software 220 begins the test process, the test software 220 is no longer needed to ensure the testing is carried out. That is, although the test software 220 may be used to provide the test data used to perform the test (e.g., the mappings in the page tables 210, translation requests, and expected results), the test itself is carried out solely in hardware independent of the test software 220. Thus, the test software 220 is free to carry out different tests on the processor chip 105 so long as these tests do not alter the ability of the non-core MMU 145 to perform the memory translations. For example, while the MMU testor 155 validates the non-core MMU 145, the test software 220 can test the core MMUs in the processor chip 105. If an error is detected or the test is completed successfully, the MMU testor 155 can send a message to the test software 220 indicating the results of the test. In another embodiment, the MMU testor 155 can use an interrupt signal to provide the results to the processing core in the processor chip 105.

In one example, multiple MMU testors 155 may be used to test the same non-core MMU 145. For example, the FPGA 150 may include a second MMU testor 155 which transmits different translation requests to the non-core MMU 145, or a separate FPGA with its own MMU testor may be coupled to the processor chip 105 to test the MMU 145. In this manner, additional hardware can be added to test the functionality of the non-core MMU 145.

In one embodiment, the computing system 200 may be simulated using a simulation tool rather than using physical components. For example, the simulation tool may be used to test the design of the non-core MMU 145 before the MMU 145 is fabricated onto a chip. In this embodiment, the processor chip 105 and FPGA 150 may be hardware models executing in the simulation tool. The functionality of the non-core MMU 145 and the MMU testor 155 may be defined using a hardware description language (HDL) that is then compiled and executed on the simulation tool. For example, the simulation tool may generate a model for the processor chip 105 and all its components as well as a model of the FPGA 150 and all its components. The simulation tool establishes a simulation environment where the models of the processor chip 105 and FPGA 150 are connected using a simulated PCIe link, thereby directly simulating the physical arrangement shown in FIG. 2. Because the same HDL code used to generate the simulation models will also be used to fabricate the processor chip 105 and configure the FPGA 150, the function of the non-core MMU 145 should be the same in the simulated environment as the physical environment. Testing the non-core MMU 145 using a simulation tool before the processor chip 105 is fabricated may save time and/or cost. For instance, changing the HDL code to fix a flaw or bug detected when simulating the non-core MMU 145 may be cheaper or easier than fixing bugs detected when testing the physical computing system 200.

Even though in one embodiment the hardware modules may be simulated using a simulation tool, the MMU testor and the non-core MMU are still considered separate hardware modules. Because the models may mirror the physical arrangement shown in FIG. 2, the MMU testor and non-core MMU are simulated using separate simulated computing models. That is, the MMU testor operates within a simulated FPGA while the non-core MMU operates in a simulated processor chip.

Figure 3:
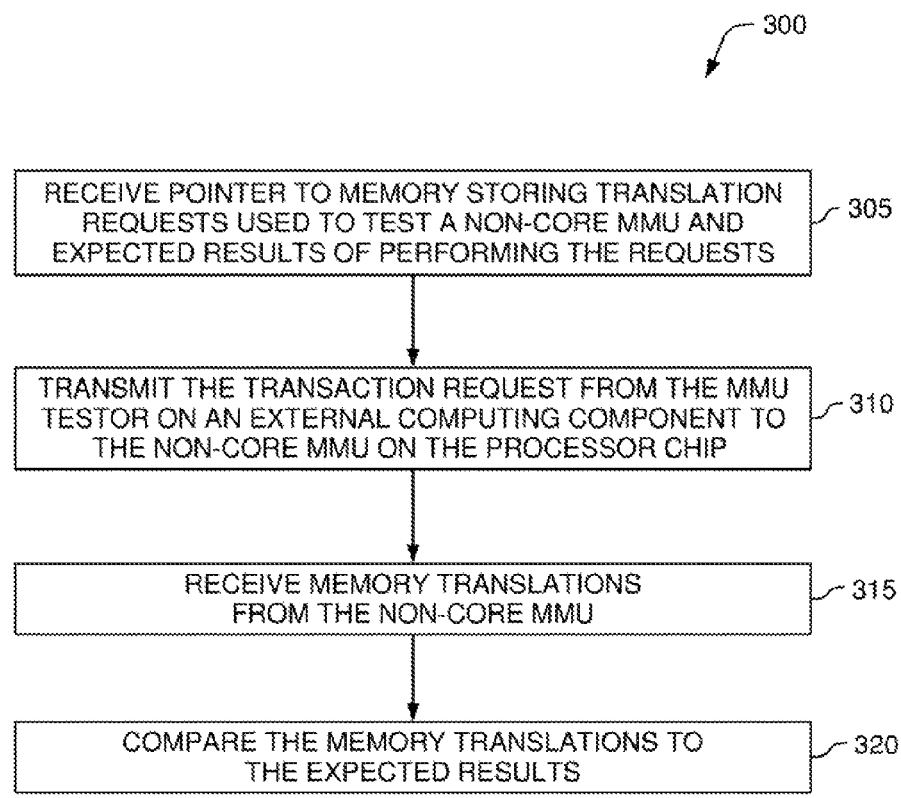
FIG. 3 is flowchart for testing a non-core MMU, according to one embodiment described herein.

FIG. 3 is flowchart of a method 300 for testing a non-core MMU, according to one embodiment described herein. At block 305, the MMU testor receives a pointer to memory storing translation requests used to test a non-core MMU and expected results of performing the requests. In one embodiment, the test software uploads the translation request and the expected results into memory in a FPGA that contains the MMU testor. Using the pointer, the MMU testor can identify the translation requests that should be transmitted to the non-core MMU during testing.

At block 310, the MMU testor transmits the translation request from the external computing component (e.g., the FPGA or separate IC chip) to the non-core MMU on the processor chip. As discussed above, the computing system that includes the external computing component, the processor chip, and the link between the two may either be a physical computing environment or a simulated computing environment. In a physical computing system, the MMU testor uses a physical link between the FPGA and the processor chip to transmit the translation requests to the non-core MMU for execution. In a simulated environment, the MMU testor uses a simulated link for transmitting the requests. In either scenario the functionality of the non-core MMU should be the same.

In one embodiment, the MMU testor may use different modes to transmit the translation requests to the non-core MMU. In one mode, the MMU testor sequentially submits the translation requests to the non-core MMU. For example, the pointer provided by the test software may point to a first translation request in a list of requests. The MMU testor then transmits the translation requests to the non-core MMU using the inherent order of the list. If the MMU testor has multiple requesting engines, the MMU testor may use the engines to send multiple requests in parallel but the requests are nonetheless sequential. In another mode, the MMU testor may transmit the translation requests randomly. The MMU testor may select a random translation request for each of the requesting engines in parallel or send only one random translation request at a time to the non-core MMU.

At block 315, the MMU testor receives the memory translations performed by the non-core MMU. Put differently, the non-core MMU receives the translation requests from the MMU testor and performs the translations using the page table and possibly a TLB. Each translation request may include a virtual memory address (or an effective memory address) which the non-core MMU converts into a physical memory address corresponding to an address in memory.

In one embodiment, the translations requests are designed to test every variant or type of translation request that may be submitted to the non-core MMU during runtime in order to catch any bugs or problems with its functionality. Translation requests may include other information besides a virtual memory address such as read/write flags, transaction type indicators, page access attributes, security or permission bits, process ID information, and the like. The translation requests may include any combination of this information to test whether the non-core MMU behaves in the expected manner. For example, some physical memory addresses may be assigned to certain processes. Thus, one translation request may include a process ID corresponding to a process that is not assigned to the physical memory addresses. If the non-core MMU nonetheless returns the physical address, then the test MMU can determine there is a bug in the non-core MMU.

In other examples, the translation requests may change the protection bits in the requests, or the page access attributes to test cache full and non-cache full situations. Moreover, the translation requests may change the security or permission bits, or provide invalid virtual memory addresses to test the functionality of the non-core MMU. In one embodiment, the translation requests may test every combination of the information that could be stored in the translation requests. As such, the translation requests may test every possible translation request that may be submitted to the non-core MMU during execution by the non-core hardware.

At block 320, the MMU testor compares the memory translations received from the non-core MMU to the expected results. The expected results indicate the data that should be returned by the non-core MMU assuming the MMU functions as intended. If the results do not match, the MMU testor knows there is a bug in the computing system. The expected results may include the physical memory address that corresponds to the virtual memory address provided in a translation request. However, as mentioned above, the MMU testor may test situations where the non-core MMU should not complete the memory translation. For example, the translation request may include a process ID or security information that indicates the process is not assigned to the corresponding physical memory location. In these cases, if designed properly, the non-core MMU should reply with an error message or a notice indicating that the memory translation cannot be performed. In another example, the MMU testor may transmit a translation request that includes a virtual memory address not in the page table. If the non-core MMU provides a physical memory address rather than indicating the virtual address was not found in the page table (e.g., a page table violation), the MMU testor can determine that the design of the non-core MMU is flawed.

Figure 4:
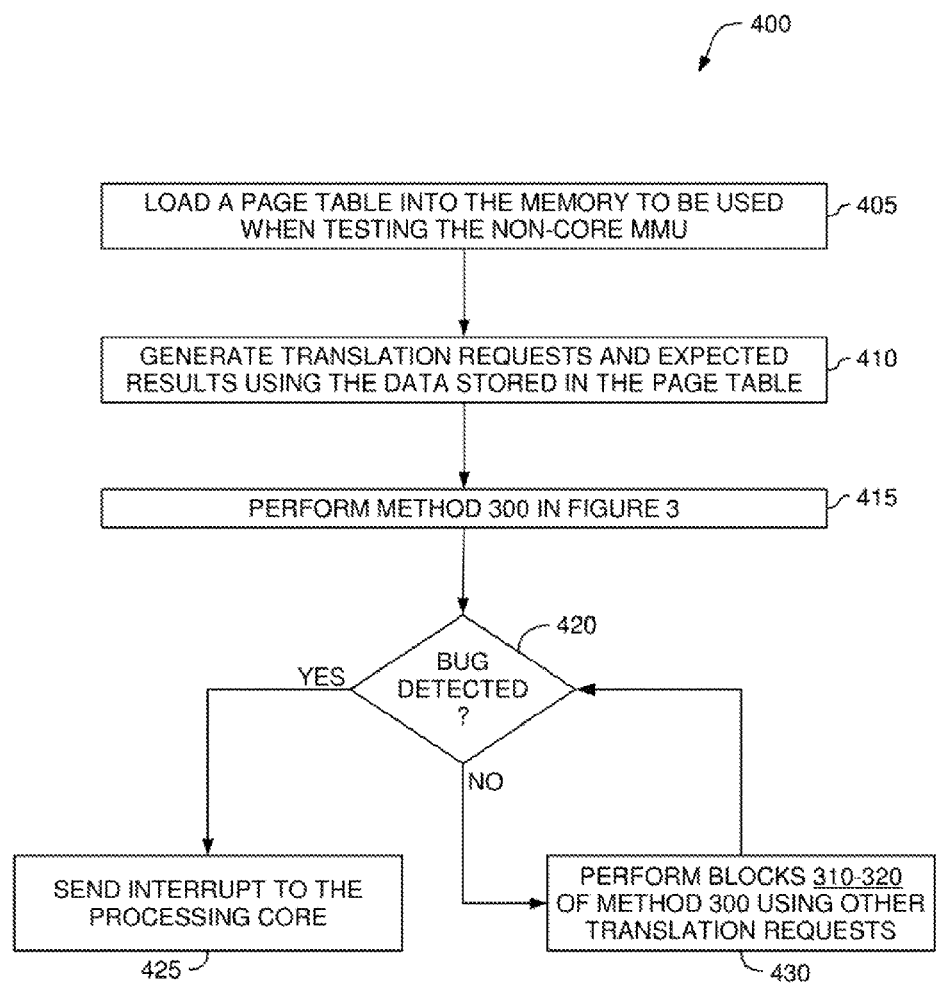
FIG. 4 is flowchart for testing a non-core MMU, according to one embodiment described herein.

FIG. 4 is flowchart of a method 400 for testing a non-core MMU, according to one embodiment described herein. At block 405, the test software loads a page table into the memory to be used when testing the non-core MMU. The page table may be a predefined list of mappings between virtual and physical memory addresses. Moreover, the page table may include security or access permissions corresponding to the mappings which indicate the process (or processes) that can access the mappings.

At block 410, the test software generates translation requests and expected results using the data stored in the page table. That is, using the mappings in the page table, the test software generates the translation requests corresponding to these mappings. As discussed above, the test software can generate translation requests that test when non-core MMU should generate an error message rather than performing the translation such as when the virtual address is invalid or a particular process does not have permission to access the physical memory address. In this manner, the test software generates translation requests that test whether the non-core MMU can accurately respond to proper and improper memory translations.

The test software may use the translation requests and page table to generate the expected results. In one embodiment, the test software uses the translation requests to query an MMU that has already been verified. For example, if a core MMU has already been tested and is functionally properly, the test software may load the page table and submit the translation requests to the core MMU. The results received from the core MMU may then be used as the expected results for testing the non-core MMU. Alternatively, a system designer or developer may evaluate the translation requests and generate the expected results using the desired functionality of the non-core MMU.

In one embodiment, the test software pre-loads the translation requests and expected results into the MMU testor before beginning to test the non-core MMU. Alternatively, the MMU testor may generate the translation requests and expected results on the fly after the test has begun. That is, the MMU testor may include the necessary logic to evaluate the page table, generate the translation requests to test the functionality of the non-core MMU, and determine the expected results of performing the translation request.

At block 415, the MMU testor performs the actions listed in method 300 of FIG. 3. That is, the MMU testor transmits the translation requests to the non-core MMU which provides the results of the memory translations to the MMU testor. The testor determines whether there is a bug in the non-core MMU by comparing the results received from the non-core MMU to the expected results.

If a bug is detected at block 420, method 400 proceeds to block 425 where the MMU testor transmits a message to the processing core or the test software indicating that there may be a problem with the design of the non-core MMU. Alternatively, if method 400 is being performed in a simulated computing environment, the MMU testor may transmit a message to the simulation tool indicating the non-core MMU may contain a bug. In one embodiment, regardless whether method 400 is performed in a physical or simulated computing environment, the MMU testor may also collect troubleshooting data to help the system designer find and fix the bug. For example, the MMU testor may output the translation request being performed when the bug was identified as well as the previous five or ten translation requests executed by the non-core MMU.

In one embodiment, even if a bug is detected at block 420, method 400 may continue to perform all the other translation requests before sending an interrupt to the processing core or test software at block 425. In this example, the MMU testor may collect and save the troubleshooting data until all the translation requests have been processed. Once complete, the MMU testor may only then transmit the troubleshooting data to the processing core or the test software for evaluation.

If no bug is detected at block 420, method 400 proceeds to block 430 where blocks 310-320 of method 300 are repeated using other translation requests. Method 400 then returns to block 420 to determine if the MMU testor identified any errors corresponding to those translation requests. In one embodiment, method 400 may continue operating indefinitely so long as no bugs are identified. For example, to test the longevity of the non-core MMU, the MMU testor will continue to submit translation requests to determine how long the physical circuit components in the non-core MMU last. To do so, the MMU testor may continue repeating the same list of translation requests. Alternatively, method 400 may stop when the MMU testor has successfully tested all the translation requests provided by the test software.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for testing a non-core memory management unit (MMU) using an MMU testor, the method comprising:
   transmitting one or more translation requests from the MMU testor to the non-core MMU disposed on a processor chip, in order to test the non-core MMU, wherein the non-core MMU is external to a processing core of the processor chip, wherein no processing core in the processor chip can transmit translation requests to the non-core MMU, and wherein the MMU testor is disposed on a computing component external to the processor chip;

receiving one or more memory translation results from the non-core MMU at the MMU testor, wherein the one or more translation requests include a virtual memory address;

comparing, using the MMU testor, the one or more memory translation results received from the non-core MMU to one or more expected results, wherein the one or more expected results include a physical memory address that corresponds to the virtual memory address; and detecting an error in the non-core MMU, using the MMU testor, based on determining that at least one of the memory translation results does not match the respective expected result.

2. The method of claim 1, wherein the computing component is a field-programmable gate array (FPGA), the method further comprising:

executing the MMU testor using circuit elements in the FPGA.

3. The method of claim 2, wherein transmitting translation requests from a MMU testor to a non-core MMU comprises:

transmitting data between the FPGA and the processor chip using a PCIe link.

4. The method of claim 1, further comprising:

transmitting an interrupt from the MMU testor to the processing core upon determining that one or more of the memory translation results received from the non-core MMU do not match the respective one or more expected results.

5. The method of claim 1, wherein non-core hardware is disposed in the processor chip, wherein the non-core hardware is communicatively coupled to the non-core MMU in the processor chip for performing memory translations.

* * * * *